United States Patent
Jin et al.

(10) Patent No.: US 8,615,806 B2
(45) Date of Patent: Dec. 24, 2013

(54) APPARATUS AND METHOD FOR DETECTING A CODE INJECTION ATTACK

(75) Inventors: Weon Il Jin, Suwon-si (KR); Hwan Joon Kim, Seoul (KR); Eun Ah Kim, Seoul (KR); Gyungho Lee, Namyangju-si (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 12/885,672

(22) Filed: Sep. 20, 2010

(65) Prior Publication Data
US 2011/0179490 A1 Jul. 21, 2011

(30) Foreign Application Priority Data
Jan. 15, 2010 (KR) .................. 10-2010-0003856

(51) Int. Cl.
*H04L 29/06* (2006.01)

(52) U.S. Cl.
USPC .......................................................... 726/24

(58) Field of Classification Search
USPC .......................................................... 726/24
See application file for complete search history.

(56) References Cited

U.S. PATENT DOCUMENTS

| 7,444,331 | B1 | 10/2008 | Nachenberg et al. |
| 7,558,796 | B1* | 7/2009 | Bromwich et al. .................. 1/1 |
| 2003/0014667 | A1* | 1/2003 | Kolichtchak ................. 713/201 |
| 2007/0083770 | A1* | 4/2007 | Heasman et al. ............ 713/190 |
| 2009/0038008 | A1* | 2/2009 | Pike .............................. 726/22 |
| 2009/0144561 | A1* | 6/2009 | Davidson et al. ............ 713/190 |
| 2009/0144827 | A1* | 6/2009 | Peinado et al. ................ 726/25 |
| 2009/0199297 | A1* | 8/2009 | Jarrett et al. .................... 726/24 |
| 2010/0064367 | A1* | 3/2010 | Lysemose Hansen .......... 726/23 |

FOREIGN PATENT DOCUMENTS

KR 10-2009-0051956 5/2009

* cited by examiner

*Primary Examiner* — Michael S McNally
(74) *Attorney, Agent, or Firm* — NSIP Law

(57) ABSTRACT

A code injection attack detecting apparatus and method are provided. The code injection attack may be detected based on characteristics occurring when a malicious code injected by the code injection attack is executed. For example, the code injection attack detecting apparatus and method may detect that a code injection attack occurs when a buffer miss is detected, a page corresponding to an address is updated, a mode of the page corresponding to the address is in user mode, and/or the page corresponding to the page is inserted by an external input.

20 Claims, 2 Drawing Sheets

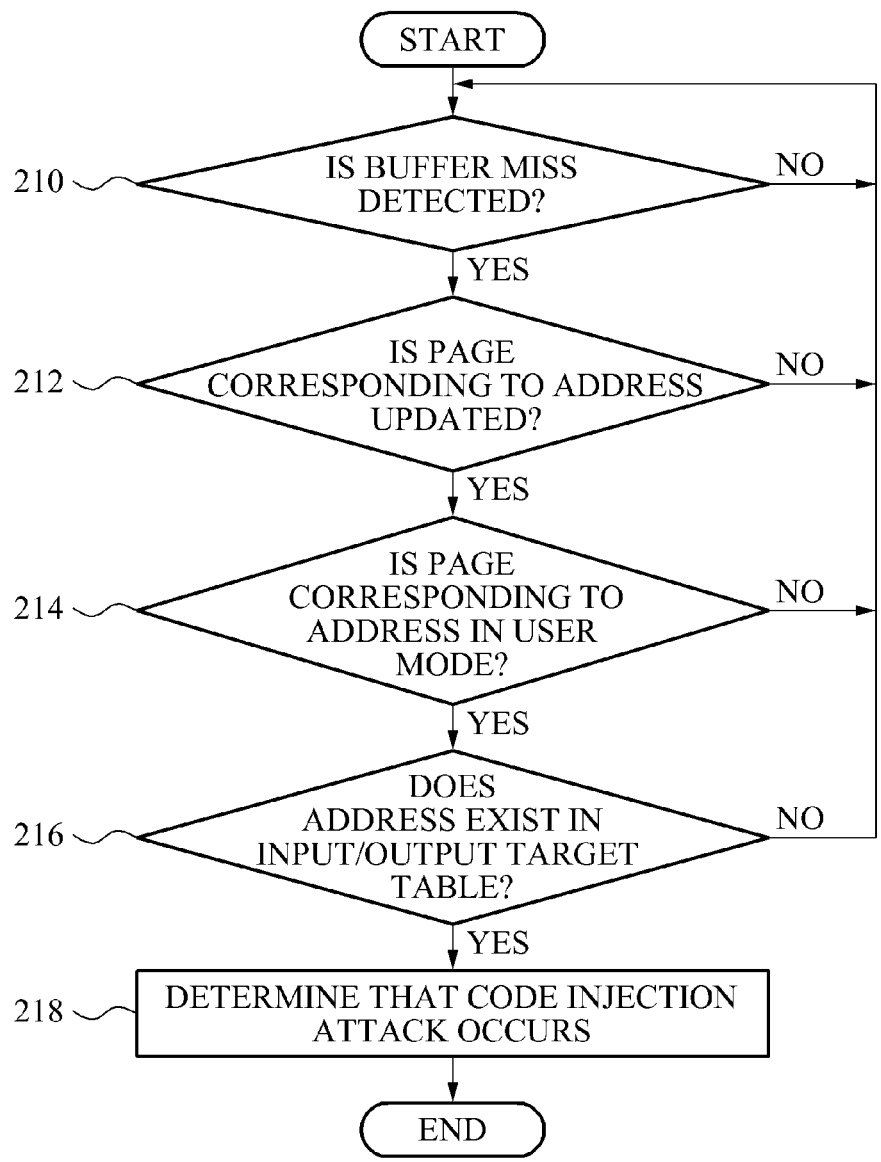

APPARATUS AND METHOD FOR DETECTING A CODE INJECTION ATTACK

CROSS-REFERENCE TO RELATED APPLICATION

This application claims the benefit under 35 U.S.C. §119 (a) of a Korean Patent Application No. 10-2010-0003856, filed on Jan. 15, 2010, in the Korean Intellectual Property Office, the entire disclosure of which is incorporated herein by reference for all purposes.

BACKGROUND

1. Field

The following description relates to an apparatus and a method for detecting a code injection attack, and more particularly, to an apparatus and method for detecting a code injection attack in which an attacker inserts a code into a process being performed, in an attempt to force execution of the inserted code by making use of a defect in an operating system (OS) or an application program in a computer system.

2. Description of Related Art

A code injection attack may be performed using a bug to cause an operating system (OS) or an application program to process erroneous data. Code injection attacks often cause damage to an OS or an application program, and often a user of a flawed system does not recognize the attack. For example, a code injection attack may increase an unauthorized user's ability to access various data and programs stored in a computer system.

When the code insertion attack inserts an attack code into a process being performed, for example, into a process being performed in a kernel mode, the attacker may be able to take control of the computer system. Thus, an attacker may overtake the command of the computer system and the computer may be operated according to a command from the attacker.

The attacker may remotely obtain a root authorization with respect to a target system through the code injection attack. The attacker may use the root authorization to steal desired information. Also, an attacker may use the computer system as a base for a distributed denial of service (DDoS) attack.

Often, the target system does not recognize the code injection attack. Accordingly, risk of damage associated with the code injection attack is significantly high. A maker of the OS and/or the application program may use a security patch and the like to block an attack repeated in the same manner as a previously known attack.

However, for previously unknown and unprepared for attacks, the code injection attack may continue to operate until defects of software are detected and eliminated. In addition, bugs and defects in software may be difficult to detect and/or eliminate.

SUMMARY

In one general aspect, there is provided an apparatus for detecting a code injection attack, the apparatus comprising an update determining unit to determine whether a page, corresponding to an address indicated by a program counter, is updated, an external input/output determining unit to determine whether the address indicated by the program counter is used by an input/output function, and a code injection detecting unit to detect whether a code injection attack occurs when the page is updated and the address is used by the input/output function.

The update determining unit may determine a page is updated when a dirty bit recorded in a page table element (PTE) of the page is set to a value of "1".

The apparatus may further comprise an input/output target table to store target addresses used by the input/output function, and an input/output monitoring unit to monitor a system call handler, and to store a target address in the input/output target table when the input/output monitoring unit determines that the system call handler is called by the input/output function, wherein the external input/output determining unit determines whether the address indicated by the program counter is present in the input/output target table.

The code injection detecting unit may determine that the code injection attack occurs when a buffer miss of the address is detected, the page corresponding to the address is updated, and the address is used by the input/output function.

The code injection detecting unit may determine that the code injection attack occurs when a buffer miss of the address is detected, the page corresponding to the address is updated, a mode of the page corresponding to the address is in user mode, and the address is used by the input/output function.

The mode of the page corresponding to the address may be determined based on active mode information recorded in a PTE of the page corresponding to the address.

The buffer miss may be a miss that occurs when the address is not present in a translation lookaside buffer (TLB).

In another aspect, there is provided a method of detecting a code injection attack, the method comprising determining an update of a page corresponding to an address indicated by a program counter, determining whether the address indicated by the program counter is used by an input/output function, and detecting that a code injection attack occurs when the page is updated and the address is used by the input/output function.

The determining the update may comprise determining that the page corresponding to the address is updated when a dirty bit recorded in a PTE of the page corresponding to the address is set to a value of "1".

The method may further comprise monitoring a system call handler and storing a target address in the input/output target table when the monitoring determines that the system call handler is called by the input/output function, wherein the determining of whether the address indicated by the program counter is used by the input/output function comprises determining whether the address indicated by the program counter is present in the input/output target table.

The detecting may determine that the code injection attack occurs when a buffer miss of the address is detected, the page corresponding to the address is updated, and the address is used by the input/output function.

The detecting may comprise determining that the code injection attack occurs when a buffer miss of the address is detected, the page corresponding to the address is updated, a mode of the page corresponding to the address is in user mode, and the address is used by the input/output function.

The mode of the page corresponding to the address may be determined based on active mode information recorded in a page table element of the page corresponding to the address.

The buffer miss may be a miss that occurs when the address is not present in a TLB.

In another aspect, there is provided an apparatus for detecting a code injection attack, the apparatus comprising a buffer management unit to detect that a buffer miss occurs when an address indicated by a program counter (PC) is not present in a translation lookaside buffer (TLB), an update determining unit to determine whether a page corresponding to the address indicated by the PC is updated, and a code injection detecting unit to detect that a code injection attack occurs on a page corresponding to the address indicated by the PC when the buffer miss occurs at the address indicated by the PC and the page indicated by the PC is updated.

The apparatus may further comprise a mode determining unit to determine whether the page corresponding to the address indicated by the PC is run in user mode or kernel mode, wherein the a code injection detecting unit detects that a code injection attack occurs on the page corresponding to the address indicated by the PC when the buffer miss occurs at the address indicated by the PC, the page indicated by the PC is updated, and the page indicated by the PC is in user mode.

The apparatus may further comprise an input/output monitoring unit to monitor a system call handler to determine whether the system call handler is called by an input/output function, and to store an address used by an input/output function in an input/output target table, and an external input/output determining unit to determine whether an address indicated by the PC is stored in the input/output target table, wherein the code injection detecting unit detects that a code injection attack occurs on the page corresponding to the address indicated by the PC when the buffer miss occurs at the address indicated by the PC, the page indicated by the PC is updated, and the address indicated by the PC is stored in the input/output table.

The apparatus may further comprise a mode determining unit to determine whether the page corresponding to the address indicated by the PC is run in user mode or kernel mode, wherein the a code injection detecting unit detects that a code injection attack occurs on the page corresponding to the address indicated by the PC when the buffer miss occurs at the address indicated by the PC, the page indicated by the PC is updated, the address indicated by the PC is stored in the input/output table, and the page indicated by the PC is in user mode.

Other features and aspects may be apparent from the following description, the drawings, and the claims.

BRIEF DESCRIPTION OF THE DRAWINGS

FIG. 2 is a flowchart illustrating an example of a method for detecting a code injection attack.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

Figure 1:
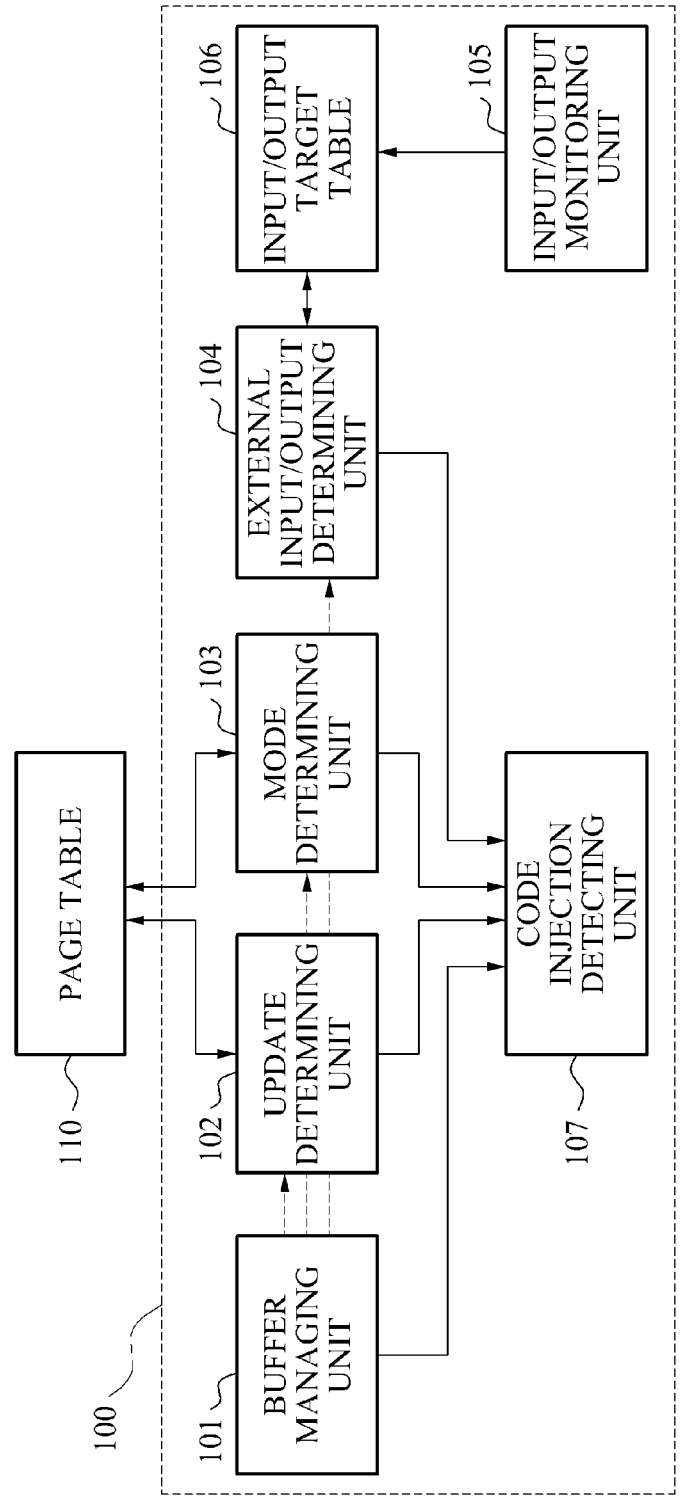
FIG. 1 is a diagram illustrating an example of an apparatus for detecting a code injection attack.

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

A code injection attack occurs when a user inserts potentially malicious code and tries to force execution of the inserted code by making a use of a defect in an operating system or an application program in a computer system or a terminal. A code injection attack detecting apparatus and method may detect a code injection attack by detecting various characteristics that occur when an attacker inserts the code FIG. 1 illustrates an example of an apparatus for detecting a code injection attack. Hereinafter, the code injection attack detecting apparatus may be referred to as an attack detecting apparatus. Also, it should be understood that the attack detecting apparatus may be included in a computer system such as a personal computer or may be included in a portable terminal, such as a cellular phone, a personal communication system (PCS), a personal data assistant (PDA), an international mobile communication-2000 (IMT2000), an 4 G orthogonal frequency division multiplexing (OFDM) terminal, and the like.

Referring to the example shown in FIG. 1, attack detecting apparatus 100 includes a buffer managing unit 101, an update determining unit 102, a mode determining unit 103, an external input/output determining unit 104, an input/output monitoring unit 105, an input/output target table 106, and a code injection detecting unit 107.

The buffer managing unit 101 may detect a buffer miss that occurs when an address indicated by a program counter is not found in a Translation Lookaside Buffer (TLB)

When the buffer miss is detected, the buffer managing unit 101 may report the detected miss to the update determining unit 102, the mode determining unit 103, the external input/output determining unit 104, and the code injection detecting unit 107.

The update determining unit 102 may determine a page update has occurred on a page corresponding to the address, based on page table 110. For example, the updating determining unit 102 may determine the update based on a dirty bit recorded in a page table element (PTE) of the page that corresponds to the address. For example, the dirty bit may be recorded as "1" when contents of the page are changed, and although the dirty bit is changed into "1" in a kernel mode, the dirty bit may be reset to "0" when the kernel mode is switched to a user mode. The update determining unit 102 may determine whether the dirty bit is "1" or "0."

The mode determining unit 103 may determine active mode information recorded in the PTE of the page that corresponds to the address, based on the page table 110. The active mode may include various types, for example, the kernel mode and the user mode. The code injection attack starts in the user mode. Accordingly, based on the page table 110, the mode determining unit 103 may determine whether the page that corresponds to the address is in user mode.

The input/output monitoring unit 105 may monitor a system call handler. When the system call handler is called by an input/output function, the input/output monitoring unit 105 may store a target address in an input/output target table 106. Because an attacker may use an external input/output function to inject an attack code in the user mode, the input/output monitoring unit 105 may monitor the system call handler to store the target address used by the input/output function.

The input/output target table 106 may store addresses used by the input/output function according to the control of the input/output monitoring unit 105.

The external input/output determining unit 104 may determine whether an address indicated by a program counter is present in the input/output target table 106. When the address is present in the input/output target table 106, the external input/output determining unit 104 may determine that a page that corresponds to the address is changed according to an external input.

The code injection detecting unit 107 may determine that the code injection attack occurs. For example, the code injection detecting unit 107 may determine that a code injection attack occurs when a buffer miss is detected, a page corresponding to the address is updated, a page corresponding to the address is in user mode, and the address is present in the input/output target table.

As another example, the code injection detecting unit 107 may determine that the code injection attack occurs when the buffer miss is detected and the page of the address is updated.

As another example, the code injection detecting unit 107 may determine that the code injection attack occurs when the buffer miss is detected, the page that corresponds to the address is updated, and the page that corresponds to the address is in the user mode.

As another example, the code injection detecting unit 107 may determine that the code injection attack occurs when the buffer miss is detected, the page corresponding to the address is updated, and the address exists in the input/output target table.

Hereinafter, a code injection attack detecting method is described with reference to FIG. 2.

FIG. 2 illustrates an example of a method for detecting a code injection attack.

Referring to FIGS. 1 and 2, the attack detecting apparatus 100 detects a buffer miss occurring when an address indicated by a program counter is not found in a TLB, in 210.

When the buffer miss is detected in 210, the attack detecting apparatus 100 determines that a page that corresponds to the address based on a page table has been updated, in 212. When a PTE of the page corresponding to the address satisfies a condition, for example, a condition that the dirty bit=1, the attack detecting apparatus 100 determines that the page corresponding to the address is updated.

When the attack detecting apparatus determines that the page corresponding to the address is updated in 212, in 214 the attack determining apparatus 100 determines whether a mode of the page that corresponds to the address is in a user mode, based on the page table. The mode of the page may be determined based on active mode information of the PTE of the page corresponding to the address.

When the attack detecting apparatus 100 determines that the page corresponding to the address is updated in the user mode in 214, the attack detecting apparatus 100 determines whether the address exists in an input/output target table, in 216. An attacker may use an external input/output function to inject an attack code to a memory in the user mode. When the address exists in the input/output target table, it may indicate that the address has been used by an external input/output. The input/output target table may store target addresses used by the input/output function.

When the attack detecting apparatus 100 determines that the address exists in the input/output target table in 216, the attack detecting apparatus 100 determines that the code injection attack occurs, in 218.

When the buffer miss is not detected in 210, when the attack detecting apparatus 100 determines that the page is not updated in 212, when the attack detecting apparatus 100 determines that the page corresponding to the address is in a kernel mode in 214, or when the attack detecting apparatus 100 determines that the address does not exist in the input/output target table in 216, the attack detecting apparatus 100 may determine that the code injection attack has not occurred and may return to 210 to repeat the process.

As described herein, the code injection attack detecting apparatus and method may analyze characteristics occurring when a malicious code injected by the code injection attack is executed. The code injection attack detecting apparatus and method may determine that the code injection attack occurs based on various factors, for example, when a buffer miss is detected, when a page corresponding to the address is updated, when the mode of the page corresponding to the address is the user mode, and/or when the address exist in the input/output target table, thereby detecting the code injection attack before being executed. Also, even though a defect of software is not previously known and a security patch to prevent the code injection attack has not been generated, a new code injection attack may be detected and blocked.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for detecting a code injection attack, the apparatus comprising:
   an update determiner configured to determine whether a page, corresponding to an address indicated by a program counter, is updated;
   an external input/output determiner configured to determine whether the address indicated by the program counter is used by an input/output function; and
   a code injection detector configured to detect whether a code injection attack occurs when the page is updated and the address is used by the input/output function.

2. The apparatus of claim 1, wherein the update determiner determines a page is updated when a dirty bit recorded in a page table element (PTE) of the page is set to a value of "1".

3. The apparatus of claim 1, further comprising:
   an input/output target table to store target addresses used by the input/output function; and
   an input/output monitor configured to monitor a system call handler, and to store a target address in the input/output target table when the input/output monitor determines that the system call handler is called by the input/output function,
   wherein the external input/output determiner determines whether the address indicated by the program counter is present in the input/output target table.

4. The apparatus of claim 1, wherein the code injection detector determines that the code injection attack occurs when a buffer miss of the address is detected, the page corresponding to the address is updated, and the address is used by the input/output function.

5. The apparatus of claim 4, wherein the buffer miss is a miss that occurs when the address is not present in a translation lookaside buffer (TLB).

6. The apparatus of claim 1, wherein the code injection detector determines that the code injection attack occurs when a buffer miss of the address is detected, the page corresponding to the address is updated, a mode of the page corresponding to the address is in user mode, and the address is used by the input/output function.

7. The apparatus of claim 6, wherein the mode of the page corresponding to the address is determined based on active mode information recorded in a PTE of the page corresponding to the address.

8. The apparatus of claim 6, wherein the buffer miss is a miss that occurs when the address is not present in a TLB.

9. A method of detecting a code injection attack, the method comprising:
   determining an update of a page corresponding to an address indicated by a program counter;
   determining whether the address indicated by the program counter is used by an input/output function; and
   detecting that a code injection attack occurs when the page is updated and the address is used by the input/output function.

10. The method of claim 9, wherein the determining the update comprises determining that the page corresponding to the address is updated when a dirty bit recorded in a PTE of the page corresponding to the address is set to a value of "1".

11. The method of claim 9, further comprising:
    monitoring a system call handler and storing a target address in the input/output target table when the monitoring determines that the system call handler is called by the input/output function,
    wherein the determining of whether the address indicated by the program counter is used by the input/output function comprises determining whether the address indicated by the program counter is present in the input/output target table.

12. The method of claim 9, wherein the detecting determines that the code injection attack occurs when a buffer miss of the address is detected, the page corresponding to the address is updated, and the address is used by the input/output function.

13. The method of claim 12, wherein the buffer miss is a miss that occurs when the address is not present in a TLB.

14. The method of claim 9, wherein the detecting comprises determining that the code injection attack occurs when a buffer miss of the address is detected, the page corresponding to the address is updated, a mode of the page corresponding to the address is in user mode, and the address is used by the input/output function.

15. The method of claim 14, wherein the mode of the page corresponding to the address is determined based on active mode information recorded in a page table element of the page corresponding to the address.

16. The method of claim 14, wherein the buffer miss is a miss that occurs when the address is not present in a TLB.

17. An apparatus for detecting a code injection attack, the apparatus comprising:
    a buffer manager configured to detect that a buffer miss occurs when an address indicated by a program counter (PC) is not present in a translation lookaside buffer (TLB);
    an update determiner configured to determine whether a page corresponding to the address indicated by the PC is updated; and
    a code injection detector configured to detect that a code injection attack occurs on a page corresponding to the address indicated by the PC when the buffer miss occurs at the address indicated by the PC and the page indicated by the PC is updated.

18. The apparatus of claim 17, further comprising a mode determiner configured to determine whether the page corresponding to the address indicated by the PC is run in user mode or kernel mode,
    wherein the code injection detector detects that a code injection attack occurs on the page corresponding to the address indicated by the PC when the buffer miss occurs at the address indicated by the PC, the page indicated by the PC is updated, and the page indicated by the PC is in user mode.

19. The apparatus of claim 17, further comprising:
    an input/output monitor configured to monitor a system call handler to determine whether the system call handler is called by an input/output function, and to store an address used by an input/output function in an input/output target table; and
    an external input/output determiner configured to determine whether an address indicated by the PC is stored in the input/output target table,
    wherein the code injection detector detects that a code injection attack occurs on the page corresponding to the address indicated by the PC when the buffer miss occurs at the address indicated by the PC, the page indicated by the PC is updated, and the address indicated by the PC is stored in the input/output table.

20. The apparatus of claim 19, further comprising a mode determiner configured to determine whether the page corresponding to the address indicated by the PC is run in user mode or kernel mode, wherein the code injection detector detects that a code injection attack occurs on the page corresponding to the address indicated by the PC when the buffer miss occurs at the address indicated by the PC, the page indicated by the PC is updated, the address indicated by the PC is stored in the input/output table, and the page indicated by the PC is in user mode.

* * * * *